(12) United States Patent
Takakura et al.

(10) Patent No.: US 7,050,099 B2
(45) Date of Patent: May 23, 2006

(54) SOLID-STATE IMAGE PICKUP APPARATUS

(75) Inventors: Kentaro Takakura, Takatsuki (JP); Toshiya Fujii, Otsu (JP); Hiroyoshi Komobuchi, Kyoto (JP); Yasuhiro Morinaka, Osaka (JP); Kazuyuki Inokuma, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 953 days.

(21) Appl. No.: 10/125,082

(22) Filed: Apr. 18, 2002

(65) Prior Publication Data

US 2002/0167012 A1    Nov. 14, 2002

(30) Foreign Application Priority Data

Apr. 19, 2001    (JP)    ............... 2001-120770

(51) Int. Cl.
*H04N 5/202*    (2006.01)

(52) U.S. Cl. .............. 348/254; 348/294; 348/301; 348/671

(58) Field of Classification Search .......... 348/254, 348/294, 301, 311, 671; 257/231, 240; 345/589; 382/274

See application file for complete search history.

(56) References Cited

U.S. PATENT DOCUMENTS

| 6,023,533 A * | 2/2000 | Sano et al. ............... 382/274 |
| 6,674,444 B1 * | 1/2004 | Tahara .................... 345/589 |
| 6,985,182 B1 * | 1/2006 | Morinaka et al. .......... 348/311 |

FOREIGN PATENT DOCUMENTS

| JP | 06178113 A | 6/1994 |
| JP | 10191055 A | 7/1998 |

OTHER PUBLICATIONS

U.S. Appl. No. 10/084,123, filed Feb. 27, 2002, Komobuchi et al.

* cited by examiner

*Primary Examiner*—David Ometz
*Assistant Examiner*—Gevell Selby
(74) *Attorney, Agent, or Firm*—Harness, Dickey & Pierce, P.L.C.

(57) ABSTRACT

Gray level data of boundary pixels that are adjacent to a block boundary in a photoelectric conversion section is stored. Then, a cumulative histogram regarding the number of pixels for different gray levels is produced based on the stored gray level data separately for each block, and a data table representing the correspondence between each gray level before correction and that after correction for the block to be corrected is produced so as to reduce the difference between the cumulative histograms. The data table is stored in a correction data RAM. By using the data table, the outputs of the block to be corrected are non-linearly corrected for different gray levels.

12 Claims, 10 Drawing Sheets

1

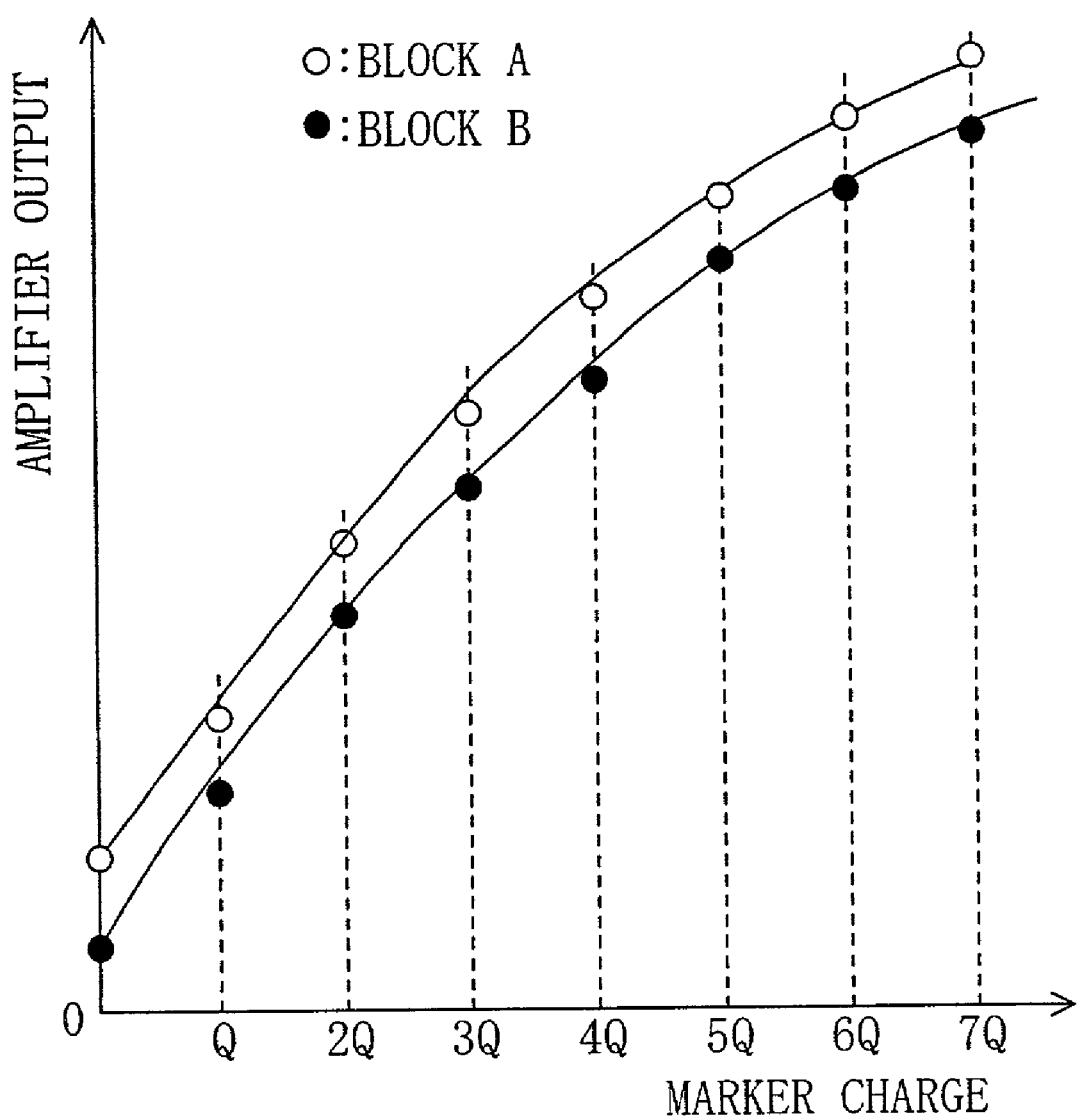

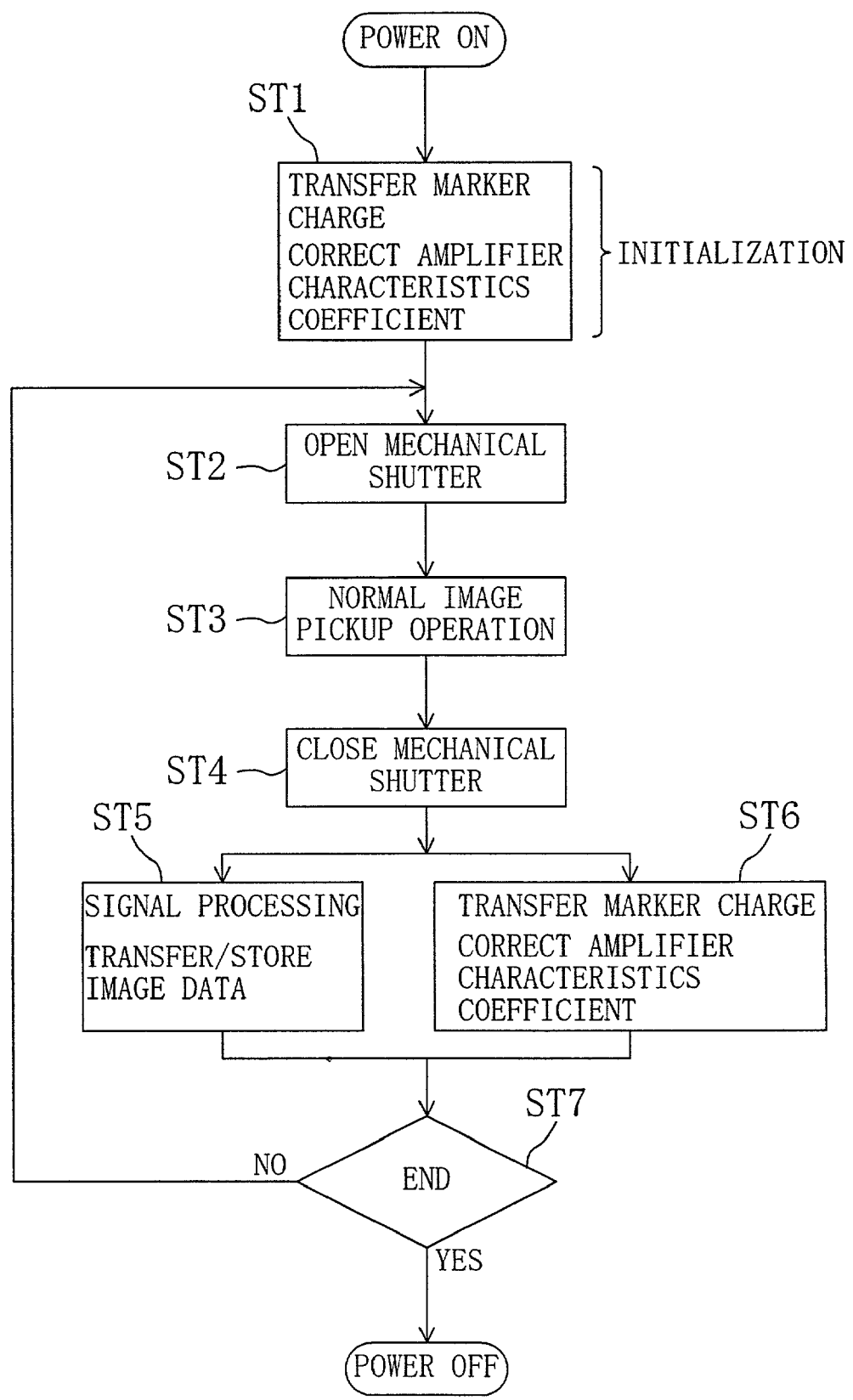

SOLID-STATE IMAGE PICKUP APPARATUS

BACKGROUND OF THE INVENTION

The present invention relates to a level correction for a solid-state image pickup apparatus (e.g., a digital still camera) including a solid-state image pickup device that includes a photoelectric conversion section divided into a plurality of blocks, and readout amplifiers for the respective blocks.

In recent years, along with the rapidly increasing demand in the field of CCD (charge coupled device) cameras such as digital still cameras and digital video cameras, there is an increasing demand for increasing the number of pixels and increasing the speed. However, if the number of pixels is increased, it takes more time to read out and transfer signal charges, thereby preventing the speed from being increased, i.e., there is a trade-off relationship therebetween. As a solution to this, it is effective to employ a parallel readout type solid-state image pickup device including a photoelectric conversion section divided into a plurality of blocks and readout amplifiers for the respective blocks.

In a case where such a parallel readout type solid-state image pickup device is used, it is necessary to correct gray level variations in the outputs from the plurality of readout amplifiers, and a non-linear level correction is necessary.

SUMMARY OF THE INVENTION

An object of the present invention is to realize a non-linear level correction on outputs from a parallel readout type solid-state image pickup device.

In order to achieve the object, according to the present invention, gray level data of at least one row of pixels in each block that are adjacent to a block boundary in a photoelectric conversion section is stored separately for each block. Then, a cumulative histogram regarding the number of pixels for different gray levels is produced based on the gray level data separately for each block, and a non-linear correction operation for different gray levels is performed so as to reduce the difference between the cumulative histograms.

Furthermore, in order to achieve a high reliability in the level correction for all gray levels, the result of a linear correction operation is selected in a low luminance region and in a saturated level region, and the result of the non-linear correction operation is selected in an intermediate luminance region, among the output gray levels from readout amplifiers.

Moreover, a solid-state image pickup device including a marker signal supply section may be employed, the marker signal supply section being provided for supplying marker signals so that marker signals of the same charge amount are input to each pair of readout amplifiers corresponding respectively to two blocks that are adjacent to each other in the photoelectric conversion section. In such a case, the output characteristics of the readout amplifiers are non-linearly corrected by using the marker signals at the start-up of the image pickup apparatus, for example, and a correction operation using cumulative histograms as described above is further performed.

BRIEF DESCRIPTION OF THE DRAWINGS

FIG. 12 is a graph illustrating an operation of an amplifier characteristics correction circuit in FIG. 11.

FIG. 13 is a flow chart illustrating operation timings of the amplifier characteristics correction circuit in FIG. 11.

DETAILED DESCRIPTION OF THE INVENTION

Figure 1:
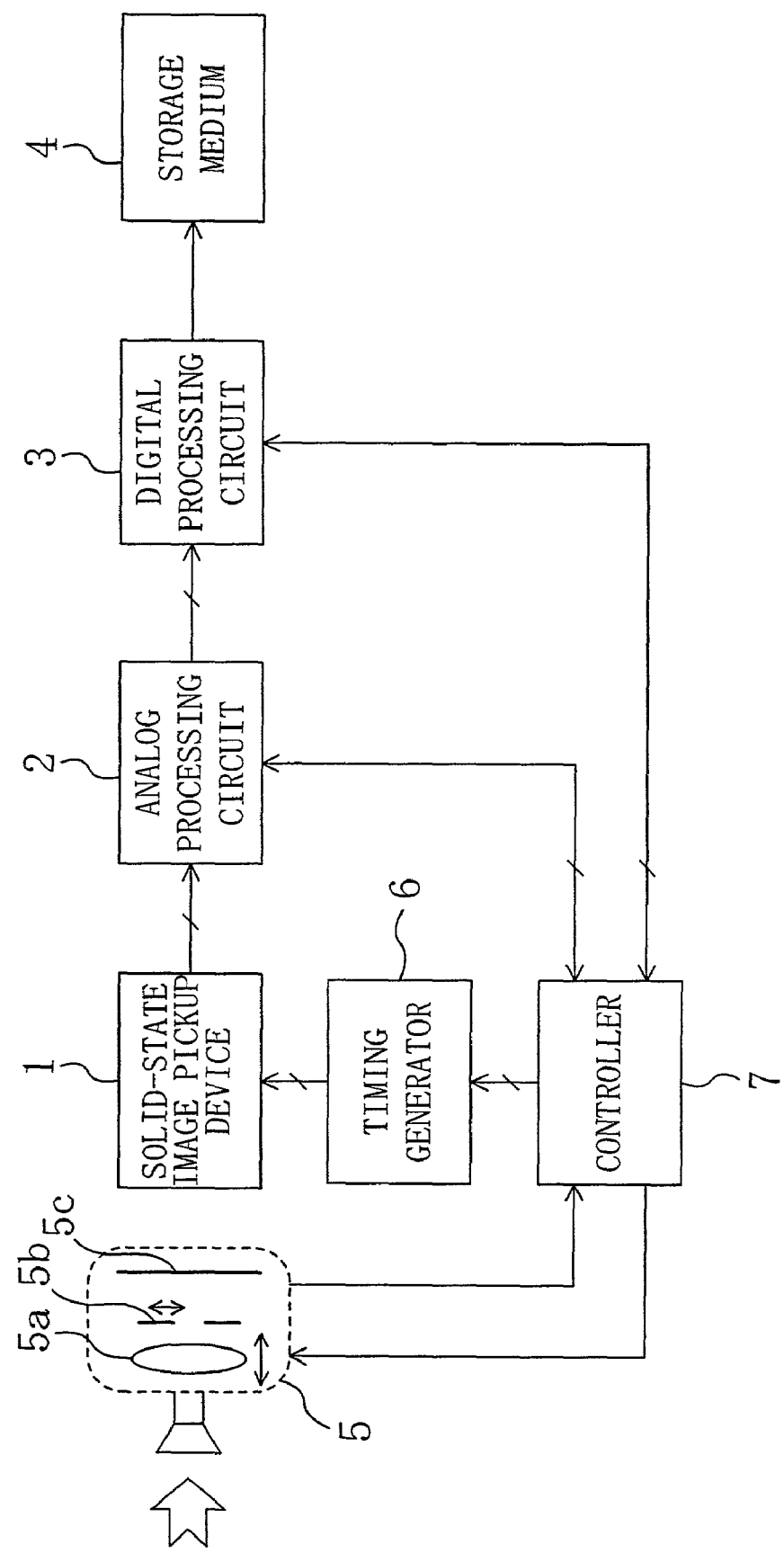
FIG. 1 is a block diagram illustrating an example of a configuration of a solid-state image pickup device according to the present invention.

FIG. 1 illustrates an example of a configuration of a solid-state image pickup apparatus according to the present invention. The solid-state image pickup apparatus of FIG. 1 includes a solid-state image pickup device 1, an analog processing circuit 2, a digital processing circuit 3, and a storage medium 4. The solid-state image pickup device 1 is a device including a photoelectric conversion section divided into four sections, and readout amplifiers for the respective blocks. The analog processing circuit 2 is a circuit for individually preprocessing analog signals that are output in parallel from the four readout amplifiers of the solid-state image pickup device 1, and then converting them into digital values. The digital processing circuit 3 is a circuit for individually correcting gray level variations in the outputs from the analog processing circuit 2, and then performing a synthesis/signal processing operation on the corrected gray level data so as to produce one frame of image, and the digital processing circuit 3 includes an internal memory for storing image data. The storage medium 4 is a removable medium for recording image data, such as a CF (compact flash) card, or an SD (secure digital) memory card.

In front of the solid-state image pickup device 1, an optical system 5 including a lens 5a, a diaphragm 5b and a mechanical shutter 5c is provided. Driving pulses are supplied to the solid-state image pickup device 1 by a timing generator 6. Furthermore, a controller 7 is provided for controlling the general operation of the solid-state image pickup apparatus. More specifically, the controller 7 has the following functions: send, to the optical system 5, a focus control signal for changing the relative position of the lens 5a with respect to the solid-state image pickup device 1 so as to adjust the focus; send, to the optical system 5, a diaphragm control signal for controlling the diaphragm 5b so as to adjust the amount of light; receive, from the optical system 5, a mechanical shutter signal that indicates a period of time for which the mechanical shutter 5c is opened; and send, to the timing generator 6, an electronic shutter signal for adjusting the charge storing time of the solid-state image pickup device 1. Moreover, the controller 7 also has a function of controlling the operation timing of each of the analog processing circuit 2 and the digital processing circuit 3.

Figure 2:
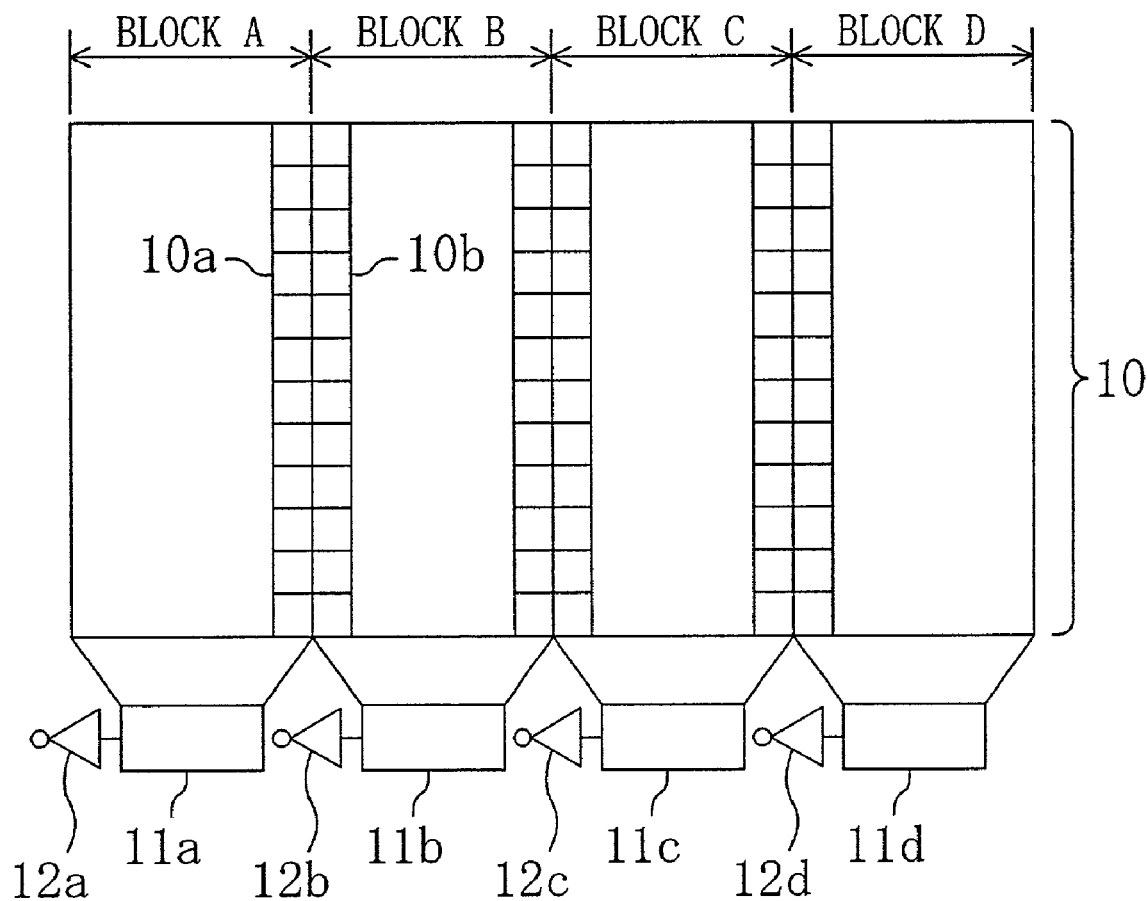
FIG. 2 is a conceptual diagram illustrating a detailed configuration of the solid-state image pickup device in FIG. 1.

FIG. 2 illustrates a detailed configuration of the solid-state image pickup device 1 in FIG. 1. The solid-state image pickup device 1 of FIG. 2 includes a photoelectric conversion section 10 divided into four strip-shaped blocks A, B, C and D, horizontal CCDs 11a to 11d for the respective blocks, and readout amplifiers 12a to 12d for the respective blocks. Note that although the number of blocks into which the photoelectric conversion section 10 is divided is arbitrary, it is assumed in the following description that the number of divided blocks is four. Gray level data of at least one row of pixels in each block that are adjacent to a block boundary in the photoelectric conversion section 10 is used for a non-linear level correction. For example, assuming that the block A is a reference block and the block B is a block to be corrected, boundary pixels 10a of the block A that are adjacent to the block B, and boundary pixels 10b of the block B that are adjacent to the block A are the pixels that are used for a level correction. Note that vertical CCDs in the photoelectric conversion section 10 are not shown in the figure.

Figure 3:
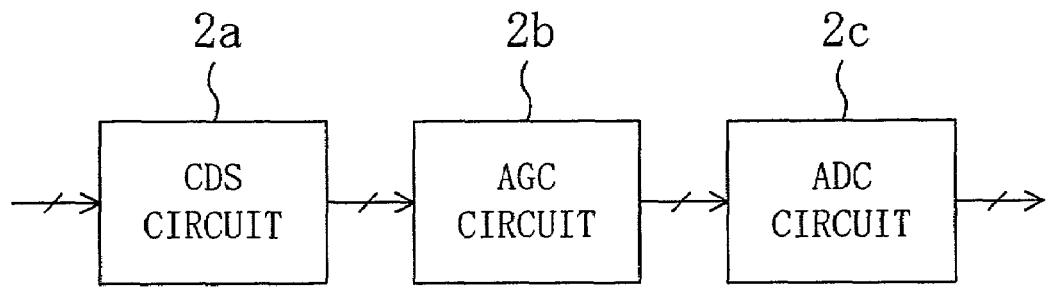
FIG. 3 is a block diagram illustrating a detailed configuration of an analog processing circuit in FIG. 1.

FIG. 3 illustrates a detailed configuration of the analog processing circuit 2 in FIG. 1. The analog processing circuit 2 includes a CDS (correlated double sampling) circuit 2a, an AGC (automatic gain control) circuit 2b, and an ADC (analog-to-digital conversion) circuit 2c. The CDS circuit 2a is a circuit for individually sampling signals that are output in parallel from the four readout amplifiers 12a to 12d of the solid-state image pickup device 1. The AGC circuit 2b is a circuit for individually adjusting the gains of the output signals from the CDS circuit 2a. The ADC circuit 2c is a circuit for individually converting the output signals from the AGC circuit 2b into digital values.

Figure 4:
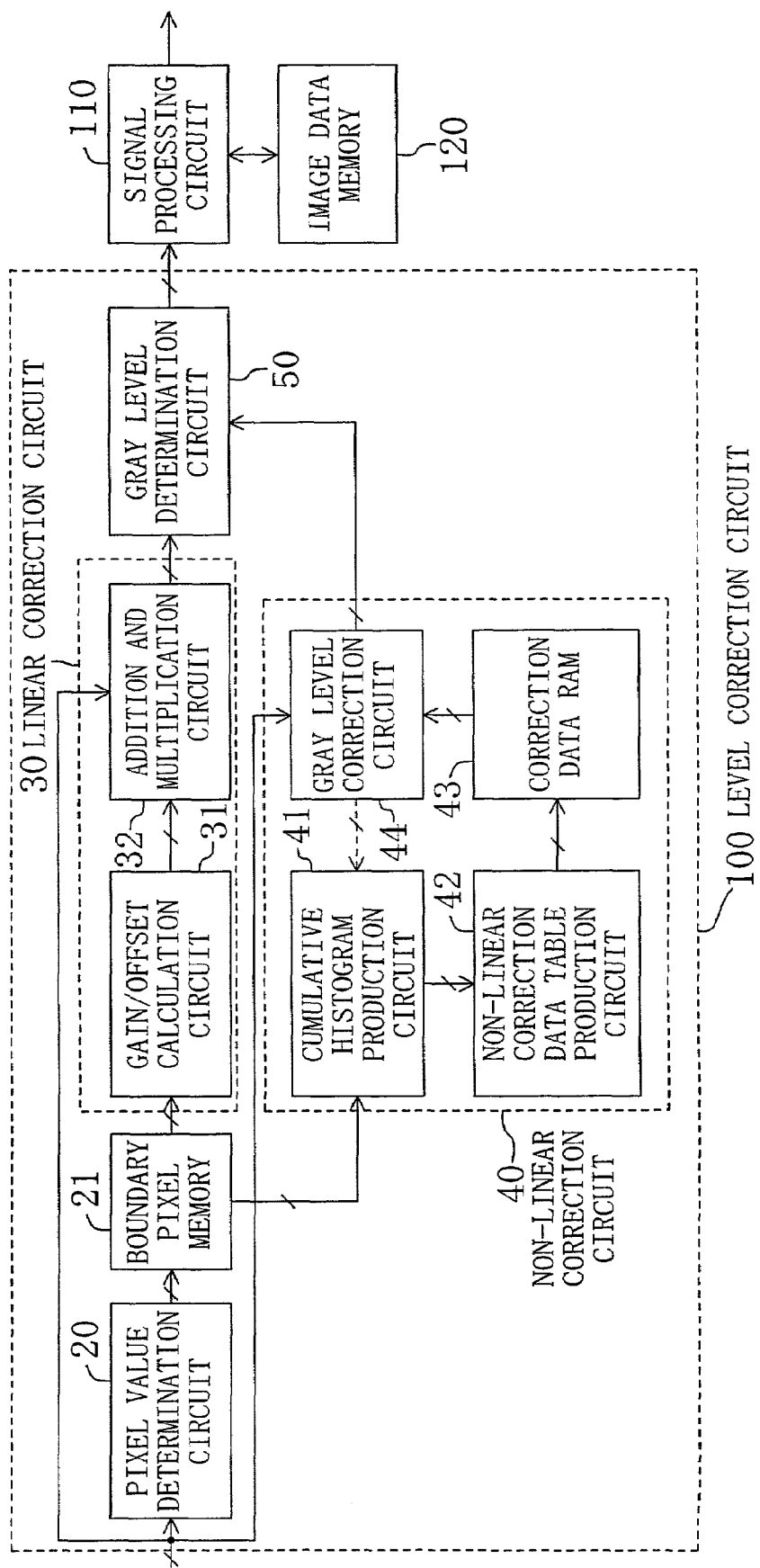
FIG. 4 is a block diagram illustrating a detailed configuration of a digital processing circuit in FIG. 1.

FIG. 4 illustrates a detailed configuration of the digital processing circuit 3 in FIG. 1. The digital processing circuit 3 of FIG. 4 includes a level correction circuit 100, a signal processing circuit 110, and an image data memory 120. The level correction circuit 100 is a circuit for individually correcting the gray level variations in the outputs from the analog processing circuit 2. The signal processing circuit 110 is a circuit for performing a synthesis/signal processing operation on the gray level data corrected by the level correction circuit 100 so as to output one frame of image. The image data memory 120 is an internal memory for storing image data obtained by the signal processing circuit 110.

The level correction circuit 100 in FIG. 4 includes a pixel value determination circuit 20, a boundary pixel memory 21, a linear correction circuit 30, a non-linear correction circuit 40, and a gray level determination circuit 50. The boundary pixel memory 21 is a memory for storing, separately for each block, gray level data of boundary pixels that are adjacent to a block boundary in the photoelectric conversion section 10, among the outputs from the four readout amplifiers 12a to 12d. For example, gray level data is stored in the boundary pixel memory 21 during the start-up of the solid-state image pickup apparatus, while image data is transferred to the image data memory 120 or to the storage medium 4, etc. The pixel value determination circuit 20 is a circuit for restricting the storage of gray level data in the boundary pixel memory 21 so that gray level data having a difference greater than a predetermined value between adjacent blocks in the photoelectric conversion section 10 is not stored in the boundary pixel memory 21. The gray level determination circuit 50 selects the result of a linear correction by the linear correction circuit 30 in a low luminance region and in a saturated level region, and selects the result of a non-linear correction by the non-linear correction circuit 40 in an intermediate luminance region, among the output gray levels from the four readout amplifiers 12a to 12d.

The linear correction circuit 30 includes a gain/offset calculation circuit 31, and an addition and multiplication circuit 32. The gain/offset calculation circuit 31 calculates, separately for each block, the gain and the offset of the gray level for the amount of incident light by using gray level data of at least two pixels in each block that are adjacent to a block boundary in the photoelectric conversion section 10, among the gray level data stored in the boundary pixel memory 21. The addition and multiplication circuit 32 performs addition and multiplication operations on the output for the block to be corrected, among the outputs from the four readout amplifiers 12a to 12d, so as to reduce the difference between the gains and offsets of the respective blocks, which are obtained by the gain/offset calculation circuit 31.

The non-linear correction circuit 40 includes a cumulative histogram production circuit 41, a non-linear correction data table production circuit 42, a correction data RAM (random access memory) 43, and a gray level correction circuit 44. The cumulative histogram production circuit 41 produces, separately for each block in the photoelectric conversion section 10, a cumulative histogram regarding the number of pixels for different gray levels, by using gray level data of boundary pixels stored in the boundary pixel memory 21. The non-linear correction data table production circuit 42 produces a data table representing the correspondence between each gray level before correction and that after correction for the block to be corrected, among the four blocks in the photoelectric conversion section 10, so as to reduce the difference between the cumulative histograms for the respective blocks, which are produced by the cumulative histogram production circuit 41. The correction data RAM 43 is a memory for storing the produced data table. The gray level correction circuit 44 performs a non-linear correction for different gray levels on the output for the block to be corrected, among the outputs from the four readout amplifiers 12a to 12d, by using the data table stored in the correction data RAM 43.

A level correction between the blocks A and B will now be described as an example, assuming that the block A is a reference block and the block B is a block to be corrected.

Figure 5:
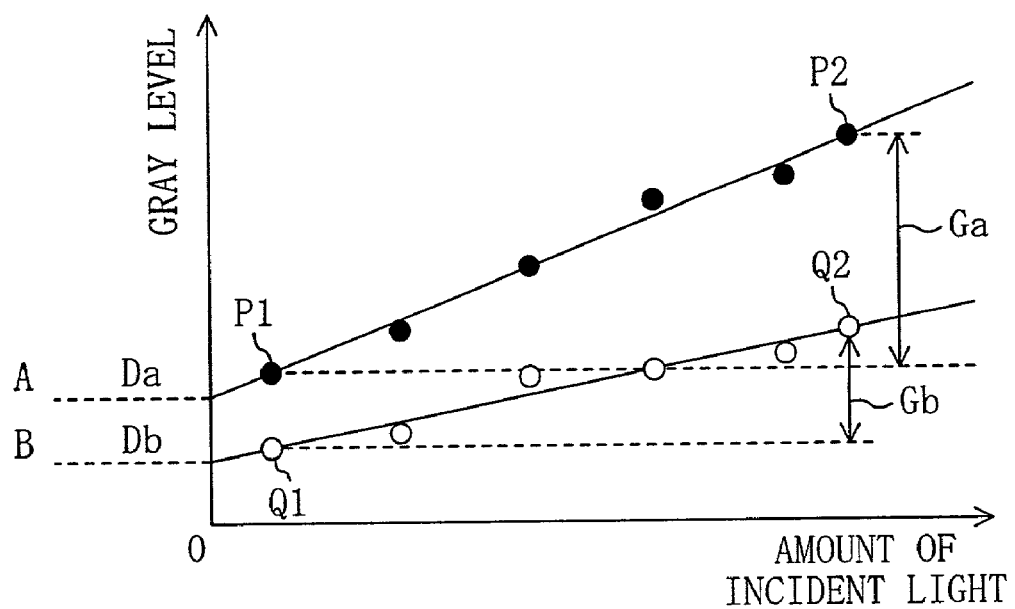
FIG. 5 is a graph illustrating an operation of a linear correction circuit in FIG. 4.

FIG. 5 illustrates an operation of the linear correction circuit 30 in FIG. 4. The gain/offset calculation circuit 31 calculates a gain Ga and an offset Da of the gray level corresponding to the amount of incident light, by using gray level data of the minimum number of pixels, i.e., two pixels P1 and P2, among the boundary pixels 10a in the reference block A. Furthermore, the gain/offset calculation circuit 31 calculates a gain Gb and an offset Db of the gray level corresponding to the amount of incident light, by using gray level data of the minimum number of pixels, i.e., two pixels Q1 and Q2, among the boundary pixels 10b in the block B to be corrected. The addition and multiplication circuit 32 performs addition and multiplication operations on the output from the readout amplifier 12b of the block B to be corrected so as to reduce the difference between the gain and offset of the block A and those of the block B, which are obtained by the gain/offset calculation circuit 31. Specifically, the addition/multiplication correction is performed by adding the offset difference (Da−Db) and multiplying it with the gain ratio (Ga/Gb) for all gray level data of the block B to be corrected.

Figure 6:
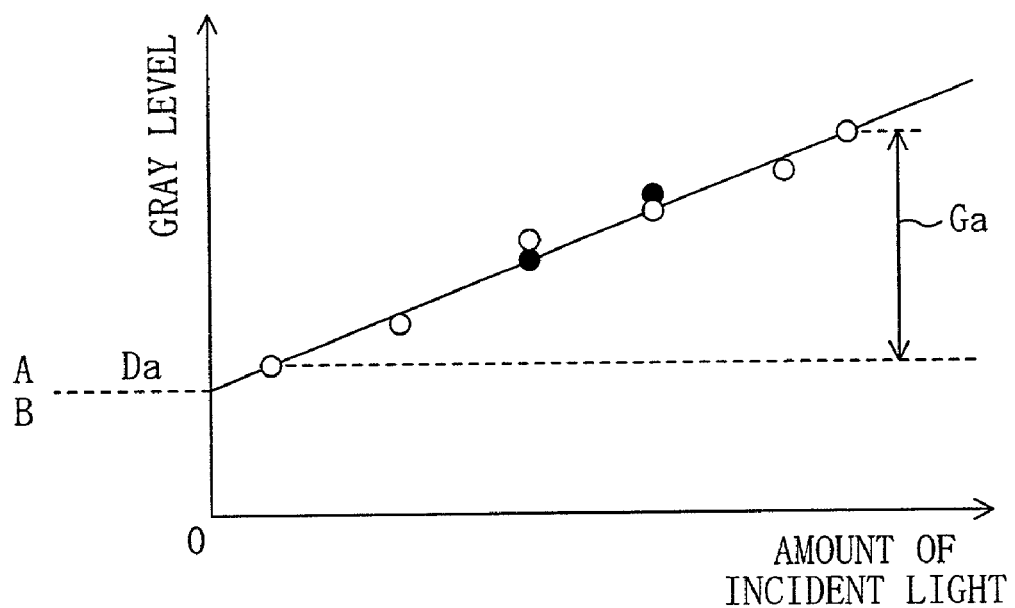
FIG. 6 is a graph illustrating the result of a correction by the linear correction circuit in FIG. 4.

FIG. 6 shows the result of the correction by the linear correction circuit 30. In a case where a non-linear difference in characteristics has occurred between the readout amplifiers 11a and 11b due to a mask misalignment during the semiconductor manufacturing process, etc., a sufficient level correction cannot be done only by performing the linear correction using gain/offset as illustrated in FIG. 6. In view of this, the non-linear correction circuit 40 is provided in the level correction circuit 100 in FIG. 4.

Figure 7:
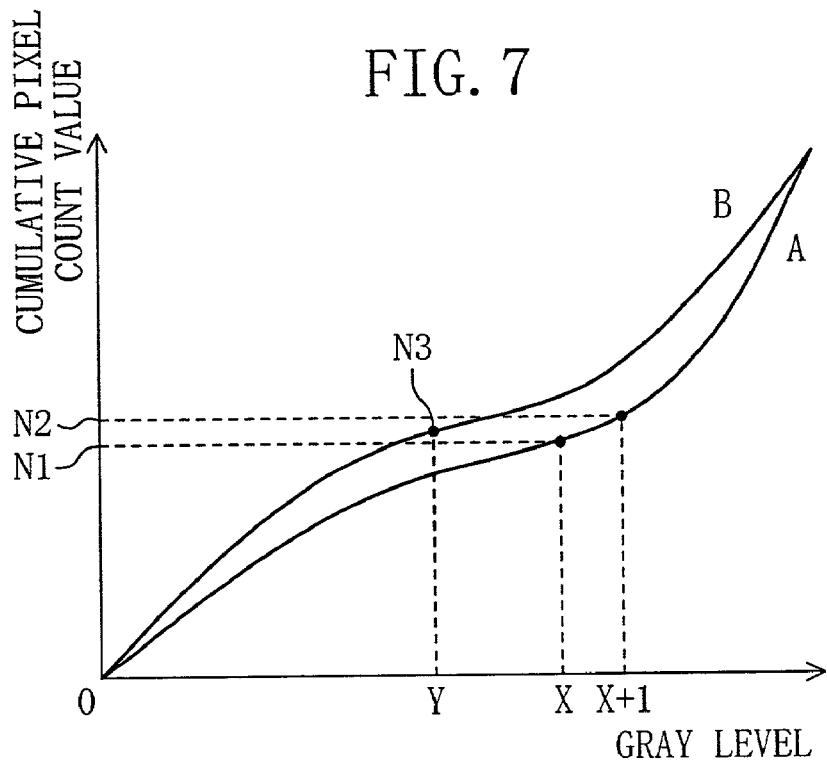
FIG. 7 is a graph illustrating an example of a cumulative histogram produced by a non-linear correction circuit in FIG. 4.

FIG. 7 illustrates an example of a cumulative histogram produced by the non-linear correction circuit 40. The cumulative histogram production circuit 41 produces a histogram regarding the number of pixels for different gray levels by using the gray level data of the boundary pixels 10a in the reference block A, and further accumulates it for different gray levels starting from the low luminance side, thereby producing a cumulative histogram of the reference block A. Furthermore, the cumulative histogram production circuit 41 produces a cumulative histogram regarding the number of pixels for different gray levels for the block B to be corrected by a similar method using the gray level data of the boundary pixels 10b in the block B.

Then, the non-linear correction data table production circuit 42 obtains a cumulative pixel count value N3 on the corrected-side cumulative histogram B that satisfies:

$$N1 \leq N3 < N2$$

where N1 is the cumulative pixel count value on the reference-side cumulative histogram A for a gray level X, and N2 is the cumulative pixel count value on the reference-side cumulative histogram A for the next gray level X+1. The non-linear correction data table production circuit 42 further obtains a gray level Y that corresponds to the cumulative pixel count value N3 on the corrected-side cumulative histogram B. Then, a data table is produced indicating that the gray level Y should be corrected to the gray level X for the block B, and the produced data table is written to the correction data RAM 43. This operation is performed for all the gray levels, thereby producing, in the correction data RAM 43, a data table representing the correspondence (Y versus X) between each gray level before correction and that after correction for the block B to be corrected.

Figure 8:
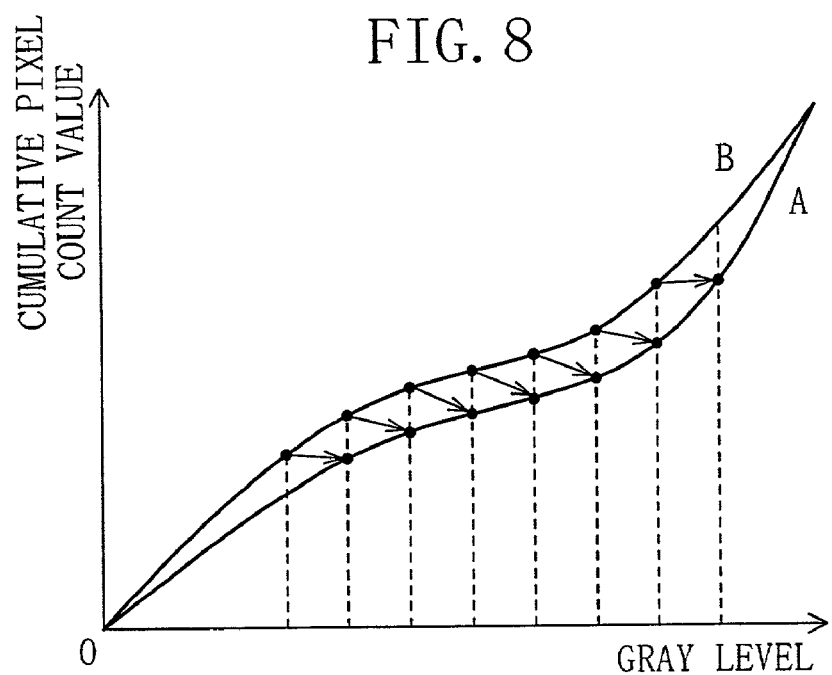
FIG. 8 is a graph illustrating an operation of a non-linear correction circuit in FIG. 4.

FIG. 8 illustrates an operation of the gray level correction circuit 44. The gray level correction circuit 44 non-linearly corrects the output from the readout amplifier 12b of the block B to be corrected for different gray levels, by using the data table written to the correction data RAM 43 so as to reduce the difference between the cumulative histogram of the block A and that of the block B.

Now, when a natural image is picked up, it is often the case that there is no substantial difference between the boundary pixels 10a of the reference block A and the boundary pixels 10b of the block B to be corrected in FIG. 2. Note however that depending on the object of which an image is to be picked up, a substantial difference may be present between the boundary pixels 10a and 10b, which may cause an error in the cumulative histogram. In view of this, with the configuration of FIG. 4, gray level data having a difference greater than a predetermined value between adjacent blocks in the photoelectric conversion section 10 is prohibited by the pixel value determination circuit 20 from being stored in the boundary pixel memory 21, whereby it is not used in the production of the cumulative histogram. For example, if a difference between the maximum values or sum values of gray level data in adjacent boundary regions is greater than a predetermined value, the gray level data in such regions are excluded. For similar reasons, the controller 7 may perform a focus control operation so as to forcibly shift the focus position off the solid-state image pickup device 1 while gray level data is stored in the boundary pixel memory 21.

Note that in the production of a cumulative histogram for each block, the cumulative histogram production circuit 41 may either use gray level data that is obtained through a single image pickup process by the solid-state image pickup device 1, or use data obtained by accumulating gray level data that is obtained through a plurality of image pickup processes. In the latter case, the controller 7 can automatically control the diaphragm or the electronic shutter when performing each of the image pickup processes for collecting gray level data so that the cumulative histogram production circuit 41 can use a wide range of gray level data.

Moreover, as indicated by a broken-line arrow extending from the gray level correction circuit 44 to the cumulative histogram production circuit 41 in FIG. 4, the result of the non-linear correction for the block to be corrected may be fed back to the cumulative histogram production circuit 41. In such a case, the cumulative histogram production circuit 41 updates the cumulative histogram for each block using the output from the gray level correction circuit 44 so that the data table in the correction data RAM 43 is updated each time an image pickup process is performed by the solid-state image pickup device 1.

Figure 9:
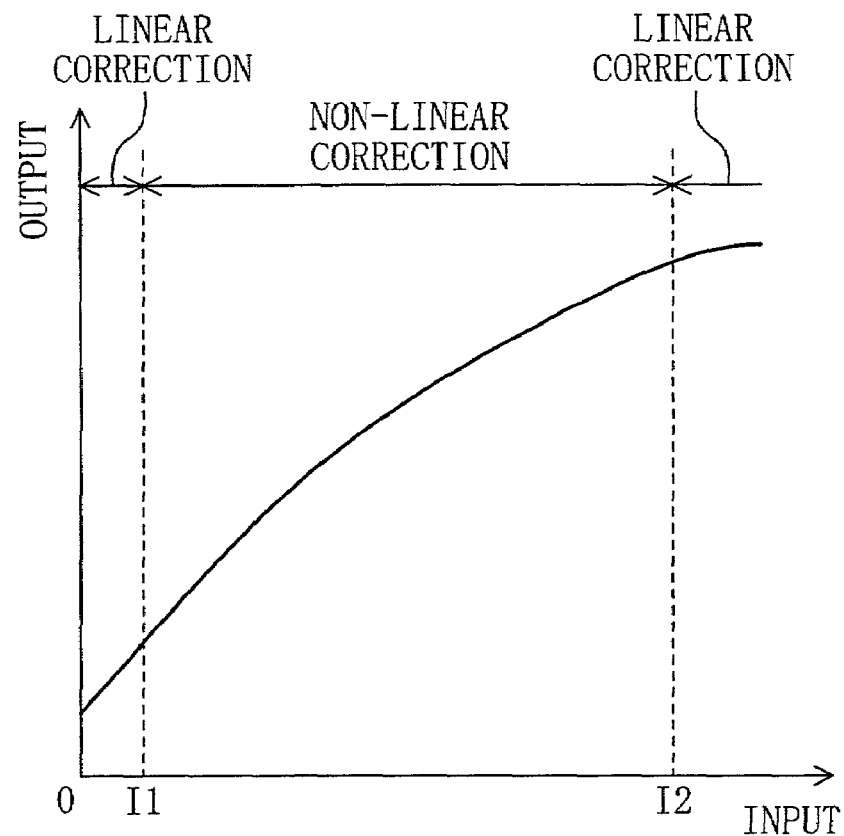
FIG. 9 is a graph illustrating an operation of a gray level determination circuit in FIG. 4.

FIG. 9 illustrates an operation of the gray level determination circuit 50. As illustrated in FIG. 9, for gray levels output from the four readout amplifiers 12a to 12d that are in a low luminance region below a luminance 11, there is a substantial noise component, whereas for those that are in a saturated level region above a luminance 12, an accurate number of pixels cannot be obtained. In either one of these regions, a proper non-linear correction cannot be performed. Therefore, the gray level determination circuit 50 selects the result of a linear correction by the linear correction circuit 30 in the low luminance region and in the saturated level region, and selects the result of a non-linear correction by the non-linear correction circuit 40 in the intermediate luminance region.

Alternatively, the output characteristics of the readout amplifiers 12a to 12d can be corrected by using a marker signal having a constant amount of charge that does not depend on the object of which an image is to be picked up. A configuration therefor will now be described.

Figure 10:
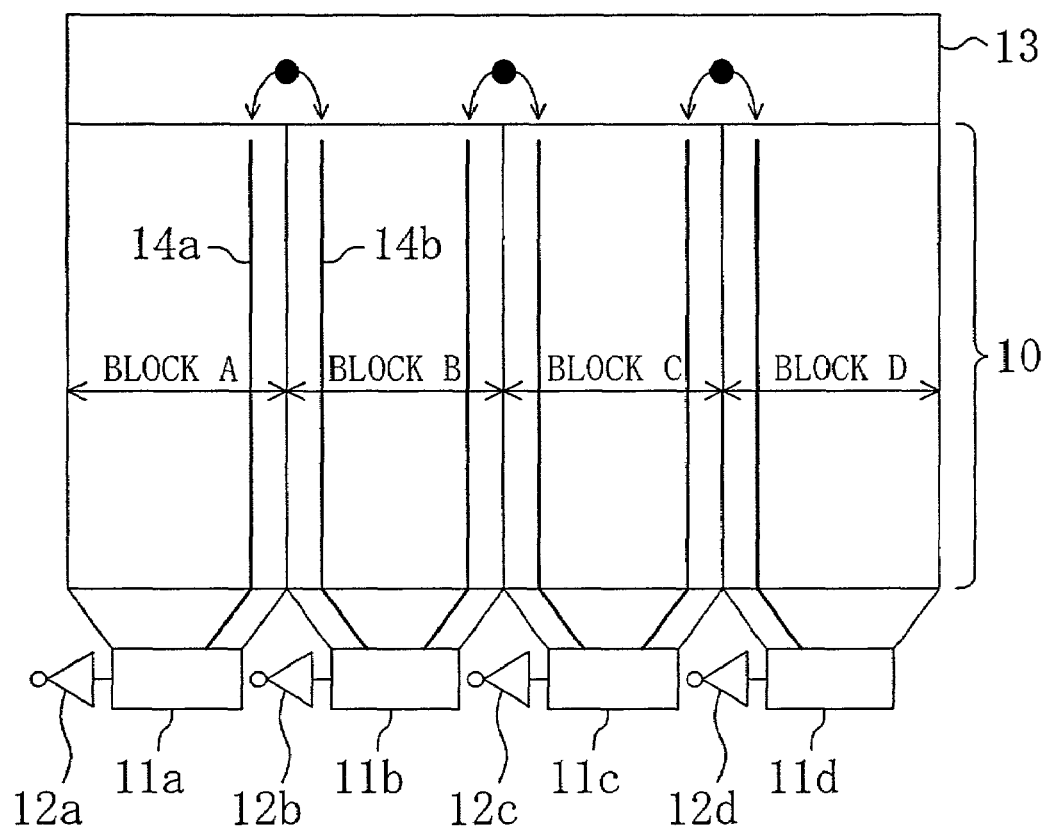
FIG. 10 is a conceptual diagram illustrating another detailed configuration of the solid-state image pickup device in FIG. 1.

FIG. 10 illustrates another detailed configuration of the solid-state image pickup device 1 in FIG. 1. The solid-state image pickup device 1 of FIG. 10 further includes a marker signal supply section 13, in addition to the photoelectric conversion section 10 divided into four strip-shaped blocks A, B, C and D, the horizontal CCDs 11a to 11d for the respective blocks, and the readout amplifiers 12a to 12d for the respective blocks. Note that although the number of blocks into which the photoelectric conversion section 10 is divided is arbitrary, it is assumed again in the following description that the number of divided blocks is four. For example, assuming that the block A is a reference block and the block B is a block to be corrected, the marker signal supply section 13 supplies marker signals for level correction to a vertical CCD 14a in the block A and to a vertical CCD 14b in the block B so that marker signals of the same amount of charge are input to the readout amplifiers 12a and 12b corresponding respectively to the adjacent blocks A and B of the photoelectric conversion section 10. Where "Q" denotes a certain amount of charge, a marker signal having the charge amount Q is transferred through the vertical CCD 14a and the horizontal CCD Ha of the block A so as to be input to the readout amplifier 12a, and another marker signal having the same charge amount Q is transferred through the vertical CCD 14b and the horizontal CCD 11b of the block B so as to be input to the readout amplifier 12b. The charge amount of these marker signals can be increased to 2Q, 3Q, 4Q, . . . , through a charge addition operation in each vertical CCD 14a, 14b, for example. The position of the vertical CCDs 14a, 14b for transferring the marker signal charge is not limited to the vicinity of a block boundary.

Figure 11:
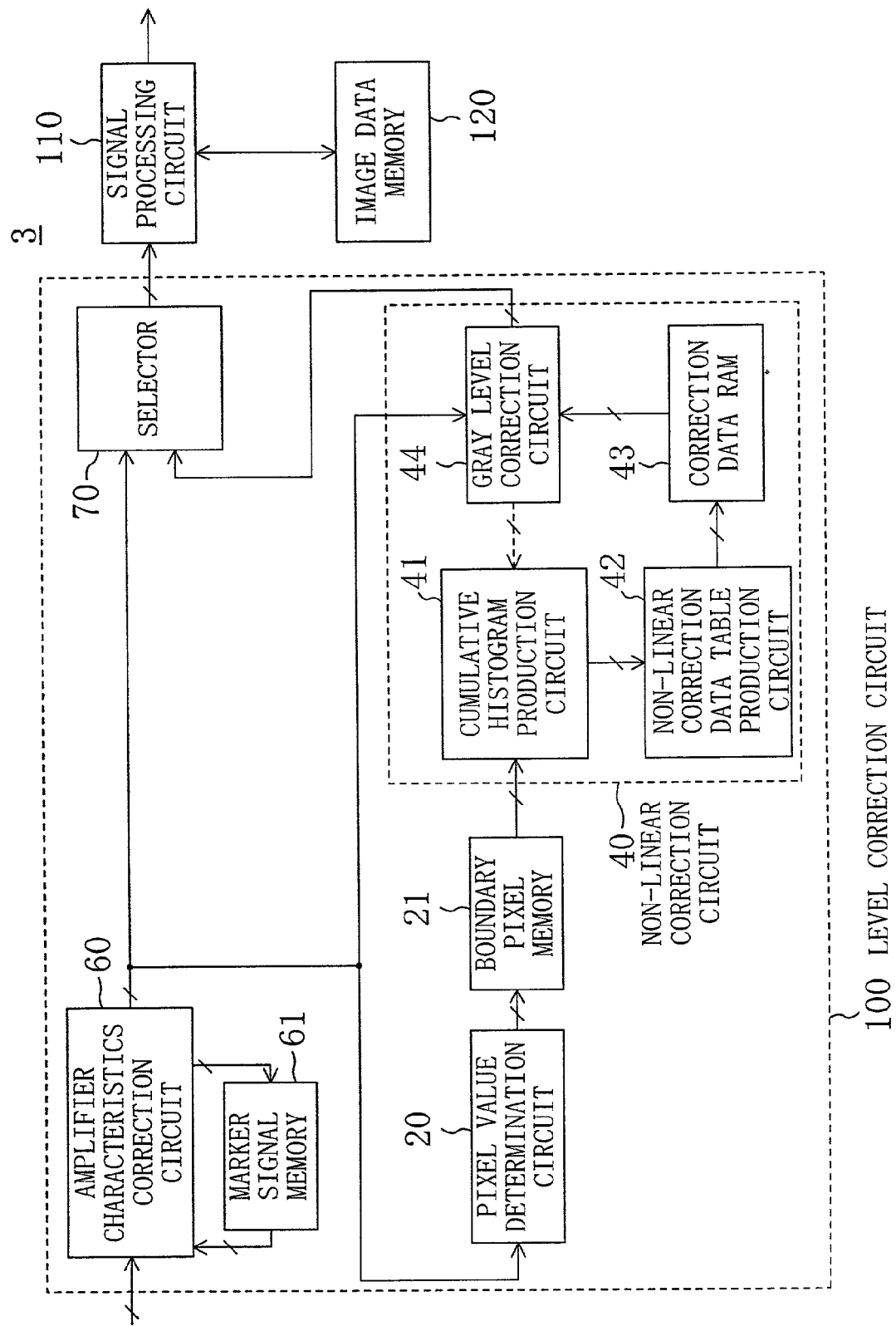
FIG. 11 is a block diagram illustrating a detailed configuration of the digital processing circuit in FIG. 1 in a case where a solid-state image pickup device of FIG. 10 is employed.

FIG. 11 illustrates a detailed configuration of the digital processing circuit 3 in FIG. 1 in a case where the solid-state image pickup device 1 of FIG. 10 is employed. The digital processing circuit 3 of FIG. 11 includes the level correction circuit 100, the signal processing circuit 110, and the image data memory 120. The functions of the signal processing circuit 110 and the image data memory 120 are as those in the case of FIG. 4.

The level correction circuit 100 in FIG. 11 includes an amplifier characteristics correction circuit 60, a marker signal memory 61, a pixel value determination circuit 20, a boundary pixel memory 21, a non-linear correction circuit 40, and a selector 70. The marker signal memory 61 is a memory for storing, separately for each block, the marker signals that are output respectively through the four readout amplifiers 12a to 12d. The amplifier characteristics correction circuit 60 is a circuit for performing a non-linear correction on the output for the block to be corrected, among the outputs from the readout amplifiers 12a to 12d, by using the marker signals recorded in the marker signal memory 61 so as to reduce the difference between the output characteristics of the readout amplifiers 12a to 12d. The gray level data of the pixels corrected by the amplifier characteristics correction circuit 60 is supplied to the boundary pixel memory 21 via the pixel value determination circuit 20. The functions of the pixel value determination circuit 20, the boundary pixel memory 21 and the non-linear correction circuit 40 are as those in the case of FIG. 4. The non-linear correction circuit 40 includes the cumulative histogram production circuit 41, the non-linear correction data table production circuit 42, the correction data RAM 43, and the gray level correction circuit 44. The selector 70 selects the output of the amplifier characteristics correction circuit 60 if there is not a difference greater than a predetermined value between the cumulative histograms of the respective blocks, and otherwise selects the output of the gray level correction circuit 44. Note that the linear correction circuit 30 in FIG. 4 is not necessary in this case.

FIG. 12 illustrates an example of an operation of the amplifier characteristics correction circuit 60 in FIG. 11 where it is assumed that the block A is a reference block and the block B is a block to be corrected. In the amplifier characteristics correction circuit 60, the marker signals for the respective blocks (which are based on the charge amounts of 0, Q, 2Q, 3Q, . . . , 7Q, for example) recorded in the marker signal memory 61 are used so as to produce, separately for each block, a curve approximated to the outputs from the readout amplifier 12a, 12b for the plurality of marker signal charge points, and the amplifier characteristics correction circuit 60 corrects the output characteristics coefficient of the readout amplifier 12b of the block B using a table or a correction formula so that the approximated curves match with one another as much as possible. Note that an approximate expression of an amplifier output can be obtained by the amplifier characteristics correction circuit 60 if there are two or more marker signal charge points.

FIG. 13 illustrates operation timings of the amplifier characteristics correction circuit 60 in FIG. 11. Referring to FIG. 13, in the initialization step ST1 immediately after the apparatus is started up by turning the power ON, marker charges are transferred and amplifier characteristics coefficients are corrected while the mechanical shutter 5c is closed. Then, the mechanical shutter 5c is opened in step ST2, and a normal image pickup operation is performed in step ST3. The mechanical shutter 5c is closed again in step ST4. In step ST5, the signal processing circuit 110 is operated so as to obtain one frame of image data, and the image data is transferred to, and stored in, the image data memory 120 or the storage medium 4. Also during this period, the amplifier characteristics correction circuit 60 can perform an operation as that in the initialization step ST1, as shown in step ST6. If it is not selected to end the image pickup process in step ST7, the process returns to step ST2.

As described above, with the level correction circuit 100 in FIG. 11, the output characteristics of the readout amplifiers 12a to 12d are matched with one another to a certain degree by the amplifier characteristics correction circuit 60 using the marker signals at the start-up of the solid-state image pickup apparatus, for example, after which the non-linear correction circuit 40 performs a correction operation using cumulative histograms for the pixel outputs of the amplifier characteristics correction circuit 60, whereby the gray level variations in the outputs from the readout amplifiers 12a to 12d can be corrected substantially perfectly.

Note that the provision of the selector 70 in FIG. 11 may be omitted, in which case the output of the gray level correction circuit 44 may be directly connected to the input of the signal processing circuit 110.

What is claimed is:

1. A solid-state image pickup apparatus, comprising:
a solid-state image pickup device including a photoelectric conversion section divided into a plurality of blocks, and readout amplifiers for the respective blocks; and
a level correction circuit for correcting gray level variations in outputs from the plurality of readout amplifiers,
wherein the level correction circuit includes:
a boundary pixel memory for storing, separately for each block, gray level data of at least one row of pixels in each block that are adjacent to a block boundary in the photoelectric conversion, among the outputs from the plurality of readout amplifiers;
a cumulative histogram production circuit for producing, separately for each block in the photoelectric conversion section, a cumulative histogram regarding the number of pixels for different gray levels, by using the gray level data stored in the boundary pixel memory;
a non-linear correction data table production circuit for producing a data table representing a correspondence between each gray level before correction and that after correction for a block to be corrected among the plurality of blocks in the photoelectric conversion section so as to reduce a difference between the cumulative histograms for the respective blocks, which are produced by the cumulative histogram production circuit;
a correction data RAM for storing the produced data table; and a gray level correction circuit for performing a non-linear correction, for different gray levels, on the output for the block to be corrected among the outputs from the plurality of readout amplifiers, by using the data table stored in the correction data RAM.

2. The solid-state image pickup apparatus of claim 1, wherein the level correction circuit further includes a pixel value determination circuit for restricting the storage of gray level data in the boundary pixel memory so that gray level data having a difference greater than a predetermined value between adjacent blocks is not stored in the boundary pixel memory.

3. The solid-state image pickup apparatus of claim 1, further comprising a controller for performing a focus control operation so as to forcibly shift a focus position off the solid-state image pickup device while gray level data is being stored in the boundary pixel memory.

4. The solid-state image pickup apparatus of claim 1, wherein the cumulative histogram production circuit is configured so as to produce the cumulative histogram by using gray level data that is obtained through a single image pickup process by the solid-state image pickup device.

5. The solid-state image pickup apparatus of claim 1, wherein the cumulative histogram production circuit is configured so as to produce the cumulative histogram by using gray level data that is obtained through a plurality of image pickup processes by the solid-state image pickup device.

6. The solid-state image pickup apparatus of claim 5, further comprising a controller for controlling a diaphragm or an electronic shutter in each of the image pickup processes so that the cumulative histogram production circuit can use a wide range of gray level data.

7. The solid-state image pickup apparatus of claim 1, wherein the cumulative histogram production circuit has a function of updating the cumulative histogram by using an output from the gray level correction circuit so that the data table in the correction data RAM is updated each time an image pickup process is performed by the solid-state image pickup device.

8. The solid-state image pickup apparatus of claim 1, wherein the level correction circuit further includes:
   a linear correction circuit for linearly correcting the output for the block to be corrected by using a portion of the gray level data stored in the boundary pixel memory; and
   a gray level determination circuit for selecting a result of a linear correction by the linear correction circuit in a low luminance region and in a saturated level region, and a result of a non-linear correction by the gray level correction circuit in an intermediate luminance region, among the output gray levels from the plurality of readout amplifiers.

9. The solid-state image pickup apparatus of claim 8, wherein the linear correction circuit includes:
   a gain/offset calculation circuit for calculating, separately for each block, a gain and an offset of a gray level corresponding to an amount of incident light by using gray level data of at least two pixels in each block that are adjacent to a block boundary in the photoelectric conversion section, among the gray level data stored in the boundary pixel memory; and
   an addition and multiplication circuit for performing addition and multiplication operations on the output for the block to be corrected, among the outputs from the plurality of readout amplifiers, so as to reduce a difference between the gains and offsets of the respective blocks, which are obtained by the gain/offset calculation circuit.

10. The solid-state image pickup apparatus of claim 1, wherein:
   the solid-state image pickup device further includes a marker signal supply section for supplying marker signals so that marker signals of the same charge amount are input to the readout amplifiers corresponding respectively to two blocks that are adjacent to each other in the photoelectric conversion section;
   the level correction circuit further includes:
   a marker signal memory for storing, separately for each block, the marker signals that are output respectively through the plurality of readout amplifiers; and
   an amplifier characteristics correction circuit for performing a non-linear correction on the output for the block to be corrected, among the outputs from the plurality of readout amplifiers, by using the marker signals recorded in the marker signal memory so as to reduce a difference between output characteristics of the plurality of readout amplifiers; and
   the gray level data of the pixels corrected by the amplifier characteristics correction circuit is supplied to the boundary pixel memory.

11. The solid-state image pickup apparatus of claim 10, wherein the amplifier characteristics correction circuit is configured to operate during a start-up of the solid-state image pickup apparatus, while a mechanical shutter is closed, or while image data is transferred to an internal image data memory or a removable storage medium.

12. The solid-state image pickup apparatus of claim 10, further comprising a selector for selecting an output of the amplifier characteristics correction circuit if there is not a difference greater than a predetermined value between the cumulative histograms of the respective blocks, and otherwise selecting an output of the gray level correction circuit.

* * * * *